United States Patent
Sagerer-Foric et al.

(10) Patent No.: US 11,873,581 B2
(45) Date of Patent: Jan. 16, 2024

(54) METHOD AND DEVICE FOR CLEANING SPINNERETS WHILE PRODUCING CELLULOSE SPUNBONDED NONWOVEN FABRIC

(71) Applicant: LENZING AKTIENGESELLSCHAFT, Lenzing (AT)

(72) Inventors: Ibrahim Sagerer-Foric, Vocklabruck (AT); Markus Malzner, Ungenach (AT); Matthias Gschwandtner, Attersee (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

(21) Appl. No.: 17/611,825

(22) PCT Filed: May 14, 2020

(86) PCT No.: PCT/EP2020/063519
§ 371 (c)(1),
(2) Date: Nov. 16, 2021

(87) PCT Pub. No.: WO2020/234122
PCT Pub. Date: Nov. 26, 2020

(65) Prior Publication Data
US 2022/0316096 A1    Oct. 6, 2022

(30) Foreign Application Priority Data

May 17, 2019    (EP) ..................................... 19175076

(51) Int. Cl.
*D01D 4/04*    (2006.01)
*B08B 3/02*    (2006.01)
(Continued)

(52) U.S. Cl.
CPC ................. *D01D 4/04* (2013.01); *B08B 3/02* (2013.01); *B08B 5/02* (2013.01); *B08B 13/00* (2013.01); *C08L 1/02* (2013.01); *C08L 2203/12* (2013.01)

(58) Field of Classification Search
CPC ... D01D 4/04; D01D 5/14; B08B 3/02; B08B 5/02; B08B 13/00; C08L 1/02;
(Continued)

(56) References Cited

U.S. PATENT DOCUMENTS 3,229,330 A * 1/1966 Ferrier ..................... D01D 5/08
425/72.2
3,485,670 A    12/1969 Fisher
(Continued)

FOREIGN PATENT DOCUMENTS

DE        215590 A1    11/1984
JP    2009155769 A1     7/2009
(Continued)

OTHER PUBLICATIONS

JP-2018035487-A (Year: 2023).*

*Primary Examiner* — Alexander Markoff
(74) *Attorney, Agent, or Firm* — Venable LLP

(57) ABSTRACT

The present invention relates to a method for cleaning a spunbonding spinneret for the production of cellulosic spunbonded nonwoven fabric from a solution of cellulose in an aqueous organic solvent by extruding the solution through nozzle holes of the spunbonding spinneret to form filaments and stretching the filaments in the direction of extrusion by means of a gas stream, during which method contaminations containing cellulose will accumulate on the spinneret surface. The method according to the invention comprises the steps of: a) spraying the contamination with an aqueous fluid
(Continued)

precipitating the cellulose; and b) detaching and carrying away the contamination by means of the gas stream.

8 Claims, 3 Drawing Sheets

(51) Int. Cl.
*B08B 5/02* (2006.01)
*B08B 13/00* (2006.01)
*C08L 1/02* (2006.01)

(58) Field of Classification Search
CPC ........ C08L 2203/12; D01F 2/00; Y02P 70/62; D04H 3/013
See application file for complete search history.

(56) References Cited

U.S. PATENT DOCUMENTS

| | | | |
|---|---|---|---|
| 3,543,332 A | 12/1970 | Wagner et al. | |
| 3,825,380 A | 7/1974 | Harding et al. | |
| 3,865,628 A | 2/1975 | Callahan et al. | |
| 4,380,570 A | 4/1983 | Schwarz | |
| 5,011,541 A * | 4/1991 | Leech | D01D 4/04 134/32 |
| 5,344,297 A * | 9/1994 | Hills | D01D 4/06 425/382.2 |
| 5,415,697 A * | 5/1995 | MacDonald | D01F 2/00 134/30 |
| 6,033,609 A | 3/2000 | Wright et al. | |
| 6,245,911 B1 | 6/2001 | Imai et al. | |
| 6,306,334 B1 | 10/2001 | Luo et al. | |
| 7,316,552 B2 | 1/2008 | Haynes et al. | |
| 7,585,438 B2 * | 9/2009 | Sommer | D01D 4/04 134/21 |
| 7,922,943 B2 | 4/2011 | Gerking | |
| 7,939,010 B2 | 5/2011 | James et al. | |
| 8,029,259 B2 | 10/2011 | Brown et al. | |
| 2001/0028955 A1 * | 10/2001 | Luo | D01D 5/18 428/393 |
| 2014/0159263 A1 * | 6/2014 | Lozano | D01D 5/18 425/8 |
| 2017/0268129 A1 | 9/2017 | Uchida et al. | |
| 2018/0250718 A1 * | 9/2018 | Sakai | B05B 5/084 |
| 2020/0291545 A1 | 9/2020 | Sagerer-Foric | |
| 2022/0316096 A1 * | 10/2022 | Sagerer-Foric | B08B 13/00 |

FOREIGN PATENT DOCUMENTS

| | | | |
|---|---|---|---|
| JP | 2018035487 A * | 3/2018 | |
| WO | 9428211 A1 | 12/1994 | |
| WO | 2019068764 A1 | 4/2019 | |

* cited by examiner

METHOD AND DEVICE FOR CLEANING SPINNERETS WHILE PRODUCING CELLULOSE SPUNBONDED NONWOVEN FABRIC

The present application is a national-stage entry under 35 U.S.C. § 371 of International Patent Application No. PCT/EP2020/063519, published as WO 2020/234122 A1, filed May 14, 2020, which claims priority to EP 19175076.9, filed May 17, 2019, the entire disclosure of each of which is hereby incorporated by reference.

BACKGROUND OF THE INVENTION

Field of the Invention

The invention relates to a method for cleaning spunbonding spinnerets during the production of cellulosic spunbonded nonwoven.

Furthermore, the invention relates to a device for cleaning spunbonding spinnerets during the production of cellulosic spunbonded nonwoven.

For several decades, various methods with different spinnerets have been used for producing fine fibers and filaments from different polymer melts and solutions by stretching the filaments extruded from the spinneret with the aid of a hot gas stream, which is oriented essentially in parallel to the direction of extrusion. The fibers and, respectively, the filaments, which have been produced in this way, can then be deposited as a nonwoven fabric on a perforated surface, for example, on a drum or a conveyor belt. Depending on the method and the polymer used, the produced nonwoven fabric is then either directly rolled up or first subjected to a post-treatment before it is then coiled up as a roll and finished for sale. In order to further decrease production costs, the largest areas of optimization in the spunbonded nonwoven industry consist in increasing the throughput and reducing the energy demand, with the quality of the nonwoven fabric remaining at least consistent.

As described in U.S. Pat. No. 3,543,332, as raw materials, polyolefins, polyamides, polyesters, polyvinyl acetate, cellulose acetate and many other meltable or soluble substances may be used, for example. Methods have also been developed for producing spunbonded nonwovens from a lyocell spinning dope, as described in U.S. Pat. Nos. 6,306,334, 8,029,259 and 7,922,943. As a further example, the production of spunbonded nonwovens from starch is described in U.S. Pat. No. 7,939,010. Since the raw materials that are used sometimes differ a lot in their properties, especially in terms of rheology, the requirements with regard to flexibility and adaptability of the spinneret design increase.

The spinnerets which so far have been used for the production of spunbonded nonwoven fabrics according to the meltblown process can be roughly divided into single-row and multi-row spinnerets.

Single-row spinnerets, as described in U.S. Pat. No. 3,825,380, can indeed be used for the production of spunbonded nonwoven fabrics from melts and solutions, but, depending on the viscosity of the melt or the solution, respectively, the pressure loss can be very high and the maximum throughput can thus be very low. In order to meet the demand for finer fibers and higher throughputs, the single-row spinneret has indeed also been subjected to further developments, as described in U.S. Pat. Nos. 6,245,911 and 7,316,552, but the design is already reaching its limits in terms of geometry and production technology. For example, in the course of the development, the distance between the extrusion capillaries has increasingly been reduced in order to increase the throughput per spinneret and to reduce the risk of spinning faults during the operation. Depending on the melt or, respectively, solution that is used and the selected operating parameters, the throughput of a single-row spinneret ranges from 10 kg/h/m to 100 kg/h/m.

In order to increase the throughput, the multi-row needle spinneret as described in U.S. Pat. No. 4,380,570 has been developed. In this case, the melt or, respectively, solution is extruded via hollow needles through a spinneret with several rows and columns. As compared to a single-row spinneret, the throughput per spinneret can be increased by the resulting needle area.

WO 2019/068764 describes a new type of spinneret with a plurality of extrusion capillaries arranged in at least two consecutive rows, wherein the extrusion capillaries are arranged in extrusion columns protruding from a base plate and integrally formed with said base plate. This type of spinneret is referred to hereinbelow as a "column spinneret".

As already described, a lot of effort has been invested in the design and manufacture of spunbonding spinnerets in order to increase the throughput per spunbonding spinneret. However, regardless of the spunbonding spinneret technology chosen, the spunbonding spinneret should also function faultlessly and the operating time per spunbonding spinneret should be as long as possible.

Even if the important parameters such as melt or, respectively, spinning dope temperature, primary air temperature, melt or, respectively, spinning dope distribution and spinning pressure are uniform, extrusion faults, phenomena of torn filaments, buildup of short-chain macromolecules at the extrusion outlet or deposits of melt or spinning dope around the primary air outlet holes may occur due to impurities in the raw material, in the melt or, respectively, the spinning dope. The above-mentioned faults can then be found in the spunbonded nonwoven as a hole or "shot". If the contamination on the spunbonding spinneret increases over time, since the extrusion holes interfere with each other and the spunbonding spinneret grows shut, the plant must be shut down, leading to loss of production.

The spinneret is then dismantled and, in case of spunbonding spinnerets for processing plastic melts—as described in U.S. Pat. Nos. 3,485,670, 3,865,628 and JP2009155769—is cleaned by pyrolysis or hydrolysis.

Also in case of lyocell spinnerets for the production of staple fibers, there are instructions regarding the cleaning of the spinnerets (U.S. Pat. No. 5,415,697), and there are also filtration devices (U.S. Pat. No. 6,033,609) for plastic melts as well as for cellulosic spinning dopes in order to prevent impurities in the melt or, respectively, spinning dope during the extrusion of the filaments, thus increasing the spinning stability. However, the finer the chosen filter, the faster it clogs, building up a major pressure loss. Finally, the spinneret must then again be switched off and dismantled, since the filter must be replaced, which, in turn, leads to loss of production.

Since the raw materials for the production of spunbonded nonwovens have been produced synthetically from plastic melts and both the purity and the molecular weight distribution can be controlled, good spinneret operating times are achieved by previously cleaning and checking the nozzle holes, permanent process control and a filter in front of the spinneret. If an extrusion hole still produces spinning faults, it will be plugged permanently, or the entire spunbonding spinneret will be disassembled and cleaned—as already described.

In case of the production of spunbonded nonwoven from a cellulosic spinning dope, this is a natural raw material in which both the molecular weight distribution and the degree of contaminations in the pulp vary strongly during the production. In contrast to the production of synthetic spunbonded nonwovens, in which, from a certain quantity of melt, approximately as much spunbonded nonwoven is produced, approximately 10 times as much spinning dope has to be processed during the production of cellulosic spunbonded nonwovens in order to achieve the same productivity. Since spinning dopes are usually solutions with a mass fraction of cellulose of 3% to 17%, the requirements regarding the throughput per spinneret, the overall throughput of a spunbonding system, the spinning stability of the spunbonding spinnerets and the operating time of a spinneret are higher than for the previously known technologies for the production of synthetic spunbonded nonwovens.

During the operation of a spunbonding spinneret for the production of cellulosic spunbonded nonwovens, extrusion and spinning faults might occur repeatedly, which leads to the fact that spinning dope remains stuck to the extrusion side of the spinneret or, respectively, in the vicinity of the primary air outlet openings. The primary air flow is thereby disrupted, and unfavorable turbulences are generated below the spunbonding spinneret.

Another result is that adjacent extrusion holes are disturbed, too, and spinning faults will arise also there, which either end up in the product as "shots" or accumulate on the surface of the spinneret.

If the spinneret surface is too dirty, the spunbonding spinneret must be switched off and cleaned. In the course of time, the quality of the products will also be impaired, since, with increasing levels of contamination of the spunbonding spinneret, more spinning faults will also be encountered in the product.

DISCLOSURE OF THE INVENTION

It is therefore the object of the present invention to extend the operating time of a spunbonding spinneret and to improve the productivity of a plant for the production of cellulosic spunbonded nonwoven.

The object is achieved by a method for cleaning a spunbonding spinneret for the production of cellulosic spunbonded nonwoven from a solution of cellulose in an aqueous organic solvent by extruding the solution through nozzle holes of the spunbonding spinneret to form filaments and stretching the filaments in the direction of extrusion by means of a gas stream, during which method contaminations containing cellulose will accumulate on the surface of the spunbonding spinneret, comprising the steps of:
  a. spraying the contamination with an aqueous fluid precipitating the cellulose
  b. detaching and carrying away the contamination by means of the gas stream.

Furthermore, the object is achieved by a device for performing the method according to the invention, comprising
a spray device comprising at least one spray nozzle for applying the aqueous fluid precipitating the cellulose onto the surface of the spunbonding spinneret.

Preferred embodiments are indicated in the subclaims.

DETAILED DESCRIPTION OF THE INVENTION

Figure 1:
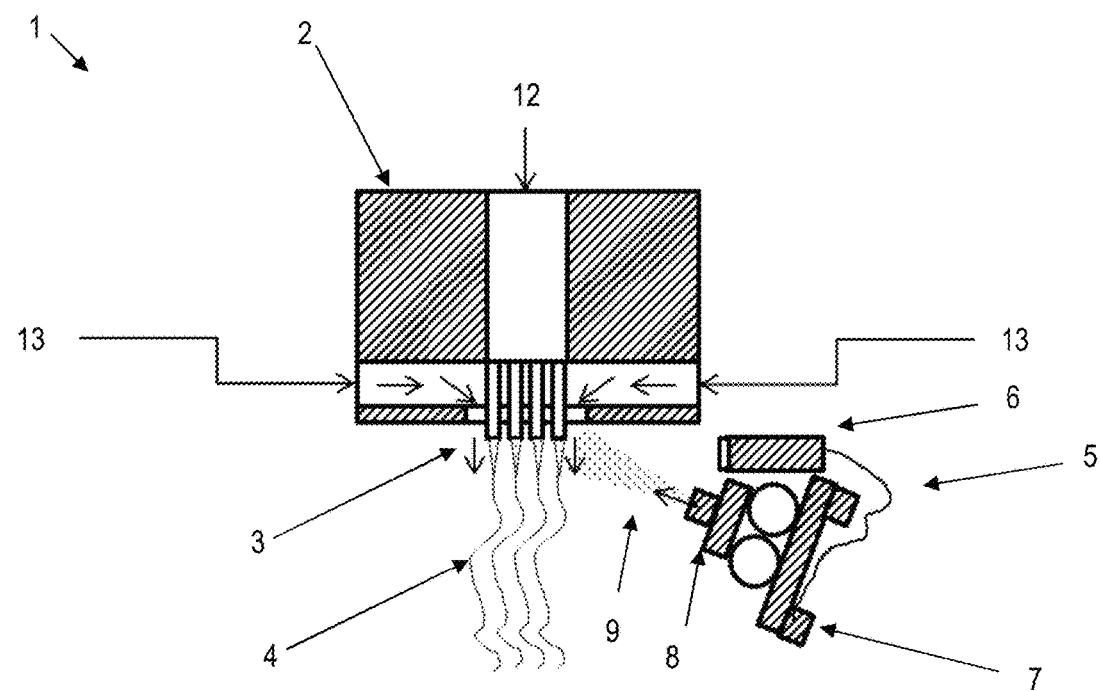
FIG. 1. shows an embodiment of the device according to the invention under the spunbonding spinneret in a side view

By means of the present invention, a method and a device are provided which can extend the operating time of a spunbonding spinneret and can improve the productivity of a plant for the production of cellulosic spunbonded nonwoven.

In particular, the method according to the invention allows the spinneret surface of spunbonding spinnerets to be cleaned by means of the device according to the invention during an ongoing operation.

The method according to the invention can be used for cleaning spunbonding spinnerets for the production of spunbonded nonwovens from spinning dopes, in which cellulose has been dissolved.

Using the example of the production of cellulosic spunbonded nonwovens, the method according to the invention provides numerous improvements and advantages in terms of the economic efficiency of the production plant, the operation of the plant, product quality and work safety, since the availability of the plant is higher and the spunbonding spinnerets need to be dismantled and cleaned less frequently.

According to the invention, an unexpected cleaning effect is achieved in that an aqueous fluid precipitating cellulose is sprayed either selectively onto the contaminations on the surface of the spunbonding spinneret or across the entire contamination area. It has been shown that, as a result, even more contaminations will form temporarily on the spunbonding spinneret. Temporarily, more extrusion and spinning faults will also result from the spraying. However, the contamination now essentially consists of extruded spinning dope (that is, cellulose solution). As a result of the spraying, the cellulose coagulates from the contamination/spinning dope and forms a solid film or, respectively, coating on the spunbonding spinneret. After a short time, this is suddenly entrained by the gas stream emerging from the spunbonding spinneret and is torn off from the surface of the spunbonding spinneret. The surface of the spunbonding spinneret is thus cleaned abruptly.

In doing so, the manner in which the gas stream is generated, which may vary in the above-described types of spunbonding spinnerets, is not important for the implementation of the method according to the invention.

All types of spunbonding spinnerets as described above have primary air outlet openings and, in each case, an individual guidance of the gas stream, which all, however, enable the cleaning principle according to the invention.

Advantageously, the spunbonding spinneret has to be replaced much less frequently due to the method according to the invention. Therefore, the operating time of the spunbonding spinneret will be prolonged, and the productivity of a production plant will be increased.

The operating time of a spunbonding spinneret without the method according to the invention lasts from a few hours to a few days. The necessary replacement of fine filters, which are positioned in front of the spunbonding spinnerets and have to be changed regularly because of excessive back pressure, also contributes to this. Due to the method according to the invention, the filters can be chosen to be coarser or, respectively, can be omitted completely, since contaminations on the surface of the spunbonding spinneret can be removed quickly. The operating time of the spunbonding spinnerets can thereby be prolonged by weeks.

The extended intervals of changing the spunbonding spinneret result in a decrease in the effort for removal, disassembly, cleaning, re-examination, assembly and reinstallation of the spunbonding spinneret. In comparison to spinnerets for the production of staple fibers, spunbonding spinnerets are significantly larger. With lengths of 1 m to 5 m per spunbonding spinneret and a mass of several tons including spinning dope distributor, every manipulation, as well as every installation and removal of the spunbonding spinneret, constitutes a major effort for the operating personnel. Since very expensive precision tools are involved, great care must be taken during removal, assembly and cleaning.

It has turned out to be a further advantage of the method according to the invention that the spunbonding spinneret does not have to be dismantled in the event of planned product changeovers or standstills even after several days of standstill. When the spinning dope is restarted and the spunbonding spinneret starts spinning, contaminations will indeed occur initially on the surface of the spunbonding spinneret, but they are removed also by the method according to the invention, and the production can be continued faultlessly.

An advantage of the method according to the invention is that it can be repeated as often as desired without great effort (since the spunbonding spinneret does not have to be dismantled).

In a preferred embodiment, the method according to the invention is characterized in that it is carried out during the ongoing production process and without an interruption thereof.

The method according to the invention enables that the manufacturing process, in particular the spinning dope preparation and the supply to the spunbonding spinneret, does not have to be shut down during the cleaning process. Notably in contrast to a spunbonded nonwoven production from plastic granulate, the shutdown, the cleaning and the restart of the spinning dope supply and of the solvent recovery are very complex. The more constant the operation of the spinning dope supply can be, the less operational effort is created and the higher is the productivity of the plant.

If the method according to the invention is performed at the end of a production roll or during the switching from one roll to the next, either the final layers of the roll or the entire changeover roll, in which the torn-off contaminants are contained, can be discarded. Subsequently, the production can be continued with a clean spunbonding spinneret, without spinning faults and contaminations. Therefore, an ongoing manufacturing process without interruption is possible.

In a preferred embodiment, the method according to the invention is characterized in that it comprises the following further steps:
  c. visual inspection of the surface of the spunbonding spinneret
  d. detection of contaminants on the surface of the spunbonding spinneret
  e. positioning of a spray device at a position suitable for spraying the contamination.

Due to the fact that the method according to the invention can be carried out without interrupting the manufacturing process, it basically can be carried out without specific monitoring or control measures. For example, the method could be performed across the entire surface of the spunbonding spinneret only at certain predetermined time intervals (or, e.g., each time with a roll-change), completely independently of contaminations that actually arise.

However, the surface of the spunbonding spinneret is preferably checked with regard to the occurrence of contaminations in order to specifically clean only those parts of the spunbonding spinneret that are contaminated.

In this embodiment, the method according to the invention is preferably characterized in that at least one of steps c) to e), preferably all of steps c) to e), is/are carried out automatically.

Optionally, at least one of steps c) to e), preferably all of steps c) to e), can, of course, also be carried out manually.

Steps c) to e) are preferably carried out before steps a) and b).

In a further preferred embodiment, the method according to the invention is characterized in that the aqueous fluid is selected from the group consisting of water, water vapor, the aqueous organic solvent or mixtures thereof.

Water vapor, preferably wet steam, can be used for cleaning the surface of the spunbonding spinneret.

In a further preferred embodiment, the method according to the invention is characterized in that contaminants that have been detached and carried away are expelled from the manufacturing process.

According to the invention, the solid film of contaminants is suddenly entrained by the gas stream emerging from the spunbonding spinneret and is torn off from the surface of the spunbonding spinneret. The surface of the spunbonding spinneret is thus cleaned abruptly. As a result, the contamination ends up on the produced spunbonded nonwoven fabric or, respectively, is contained therein. It is carried along in the transport direction and rolled up with the product at the production speed.

According to the invention, single-row gap spinnerets (U.S. Pat. No. 3,825,380), multi-row needle spinnerets (U.S. Pat. No. 4,380,570) or preferably the above-mentioned column spinneret (WO/2019/068764) with lengths ranging, for example, from 0.1 m to 6 m can be cleaned.

The method according to the invention has proved to be particularly suitable for the cleaning of column spinnerets.

The cellulose throughput per spunbonding spinneret can range from 5 kg/h/m spinneret length to 500 kg/h/m spinneret length.

The cellulose content in the spinning dope can range from 4% to 17%, preferably from 5% to 15%, more preferably from 6% to 14%.

The temperature of the gas stream can range from 20° C. to 200° C., preferably from 60° C. to 160° C., more preferably from 80° C. to 140° C.

The gas flow pressure can range from 0.05 bar to 5 bar, preferably from 0.1 bar to 3 bar, more preferably from 0.2 bar to 1 bar.

The organic solvent can be a tertiary amine oxide, preferably N-methylmorpholine-N-oxide (NMMO), or an ionic liquid.

The device according to the invention for carrying out the method according to the invention comprises a spray device comprising at least one spray nozzle for applying the aqueous fluid precipitating the cellulose onto the surface of the spunbonding spinneret.

In a preferred embodiment, the device according to the invention is characterized by at least one positioning device for moving the spray device to a desired location.

In a production plant, a plurality of spunbonding spinnerets can be connected in series in the production direction, each having at least one device according to the invention for cleaning.

A single-component or multi-component nozzle, more preferably a two-component nozzle, can be used as the spray nozzle.

A single-component nozzle can be used, for example, for the application of water, aqueous organic solvent or water vapor as an aqueous fluid precipitating cellulose.

At least one liquid pump or, respectively, one vapor supply line is preferably provided for the operation of single-component nozzles.

The pressure of the single-component nozzle can range from 1 bar to 50 bar. This allows the fineness of the spray, the amount of liquid or, respectively, water vapor and the momentum to be adjusted during cleaning.

The two-component nozzle can be used, for example, for the application of water or, respectively, water vapor and aqueous organic solvent as an aqueous fluid precipitating cellulose.

The pressure of the two-component nozzle can preferably range from 0.5 bar to 20 bar and can be changed on the fluid and gas sides. This allows the fineness of the spray, the amount of liquid or, respectively, water vapor and the momentum to be adjusted during cleaning.

For the operation of two-component nozzles, a compressed air line for nebulizing the liquid is provided in addition to the liquid line, in comparison to single-component nozzles.

The positioning device can be a linear axle, preferably a rail, on which the spray nozzle can be moved along the longitudinal side of the spunbonding spinneret and can be positioned accurately.

The device according to the invention can be moved by the positioning device to a longitudinal side of the spunbonding spinneret, but preferably onto both longitudinal sides, in order to enhance the cleaning effect.

One or more positioning devices can be used per spunbonding spinneret. Each positioning device controls one or several spray nozzles.

By controlling several spray nozzles by means of a positioning device, rather large areas can be cleaned simultaneously. In one embodiment, at least one continuous rail with spray nozzles is located along the longitudinal side of the spunbonding spinnerets, whereby the entire length of the spunbonding spinnerets can be cleaned simultaneously.

The positioning device can allow adjustment of the distance between the spray nozzle and the spunbonding spinneret.

The positioning device can allow a change in the angle at which the spray nozzle is directed onto the spunbonding spinneret.

The positioning device can be operated by at least one electric motor.

The positioning device can be controlled remotely.

In a preferred embodiment, the device according to the invention furthermore comprises a detection device for detecting the contaminations.

The detection device may comprise a camera on the positioning device. Said camera may be arranged next to the spray nozzle. With the aid of the camera, the surface of the spunbonding spinneret is checked traversingly, whereupon the spray device can be brought into a position suitable for spraying the contamination. This may occur both manually and automatically.

It is preferably provided that, for each spunbonding spinneret, at least one device according to the invention is configured on each side (either in the direction of production upstream of the spunbonding spinneret or downstream of the spunbonding spinneret).

If the device is arranged upstream of the spunbonding spinneret in the direction of production, the spunbonding spinneret is sprayed by the spray device in the production direction. If the device is arranged downstream of the spunbonding spinneret in the direction of production, the spunbonding spinneret is sprayed by the spray device against the production direction.

Mixtures of those two variants are possible as well.

Particularly preferably, the device is designed such that it automatically detects contaminations with the aid of an electrically adjustable positioning device and a detection device comprising a camera, positions the spray nozzle at a position suitable for spraying the contamination and cleans the spunbonding spinneret with short spray intervals of the aqueous fluid precipitating the cellulose.

DETAILED DESCRIPTION OF THE FIGURES

FIG. 1 shows an embodiment of the device according to the invention under the spunbonding spinneret 2 in a side view 1, the spunbonding spinneret 2 producing spunbonded nonwoven filaments 4 from spinning dope 12 with the aid of incoming hot air 13 and rapidly exiting hot primary air. The spunbonding spinneret surface 3 is checked by means of the device 5 according to the invention and is cleaned, if necessary. The device according to the invention can detect contaminations, for example, with the aid of a camera 6. Thereupon, the spray nozzle 8 can be brought to the contaminated surface of the spunbonding spinneret with the aid of the positioning device 7, and the surface of the spunbonding spinneret can be cleaned by means of the aqueous fluid 9 precipitating cellulose.

Figure 2:
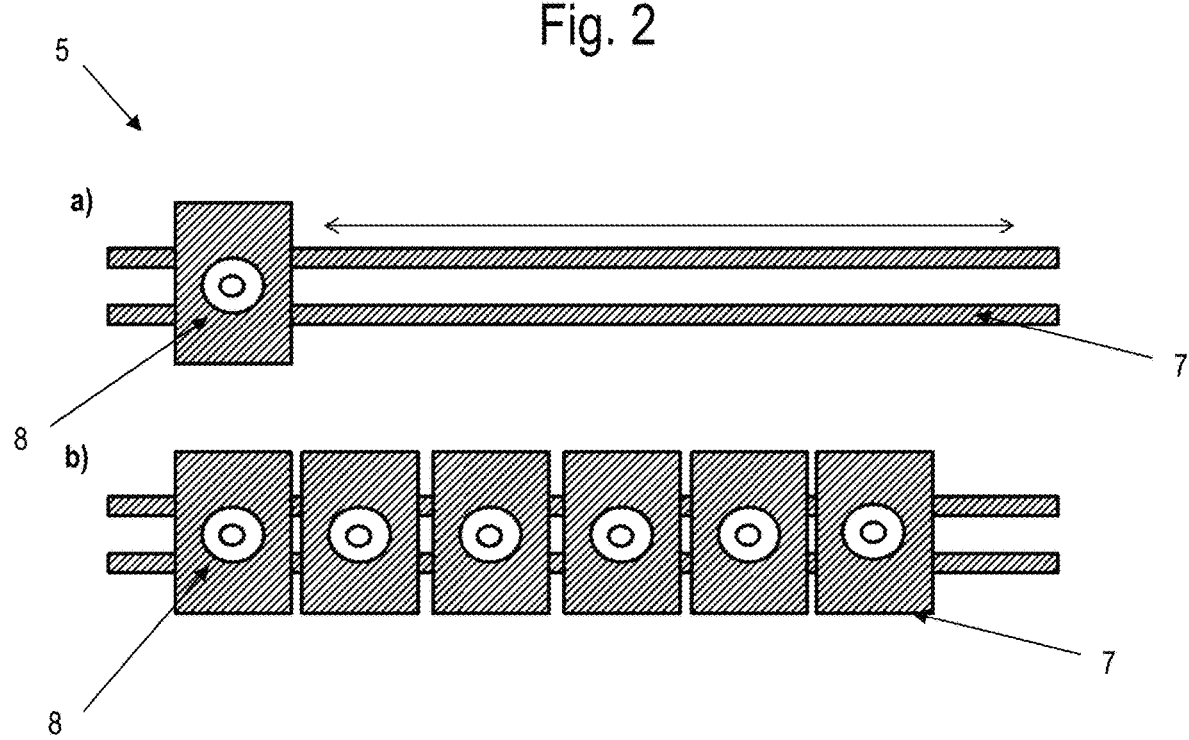
FIG. 2 shows two embodiments of the device according to the invention in a front view

FIG. 2a shows that at least one spray nozzle 8 can be attached to a positioning device 7 and can be moved along the spunbonding spinneret in a traversing manner.

FIG. 2b shows that a plurality of spray nozzles 8 can be attached to a positioning device 7.

Figure 3:
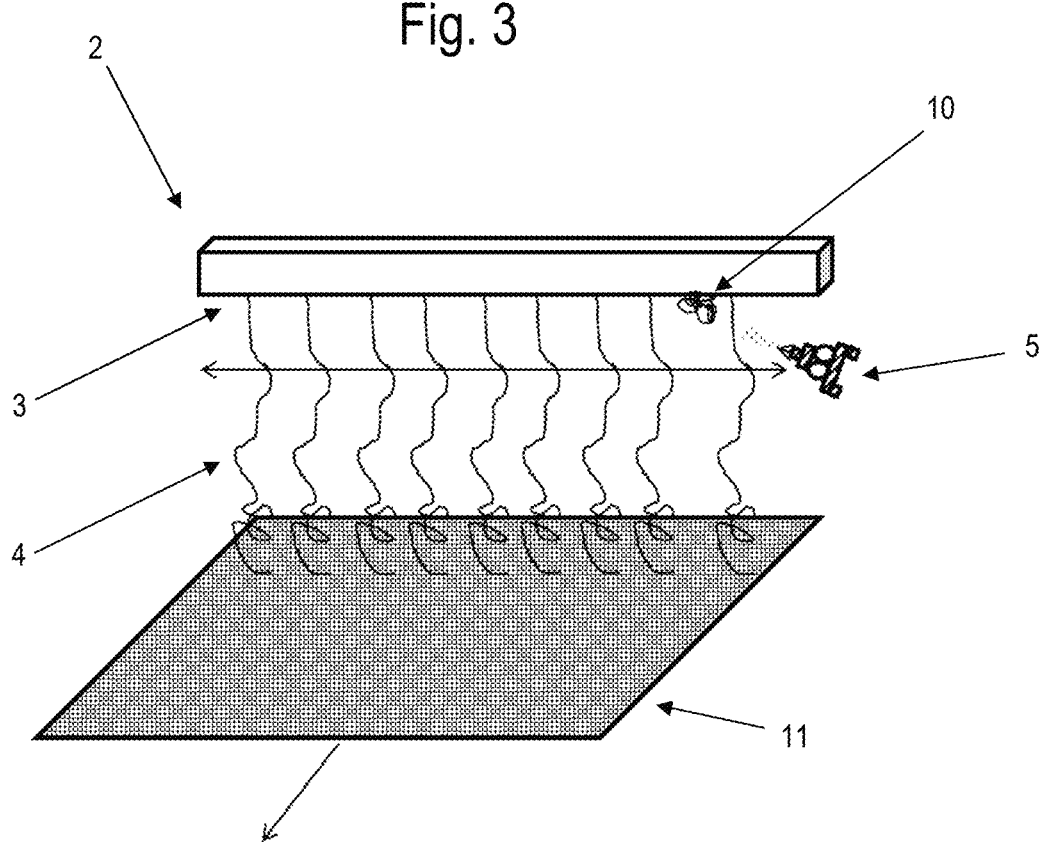
FIG. 3 shows the function of an embodiment of the method according to the invention in a perspective view

FIG. 3 shows an embodiment of the method according to the invention in a perspective view, wherein the device 5 according to the invention can be used traversingly under the spunbonding spinneret 2 for cleaning contaminations 10, while the production of the spunbonded nonwoven 11 is not interrupted.

Figure 4:
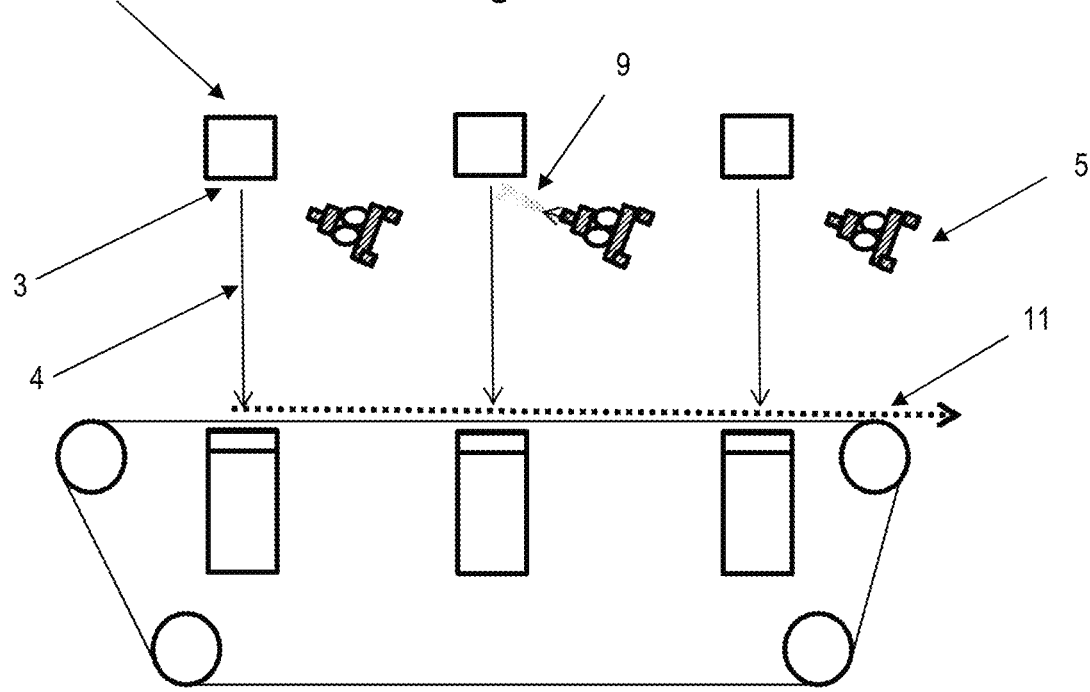
FIG. 4 shows an embodiment of the method according to the invention in a side view, with spunbonding spinnerets connected in series FIG. 5 schematically shows the sequence of an embodiment of the method according to the invention

FIG. 4 shows an embodiment of the method according to the invention in a side view, wherein a plurality of spunbonding spinnerets 2 are connected in series. For each spunbonding spinneret 2, at least one device 5 according to the invention is provided per side (in the case shown herein always downstream of the spunbonding spinneret, viewed in the production direction). In the case shown herein, when the method according to the invention is implemented, the spunbonding spinneret is sprayed by the spray device against the direction of production.

Figure 5:
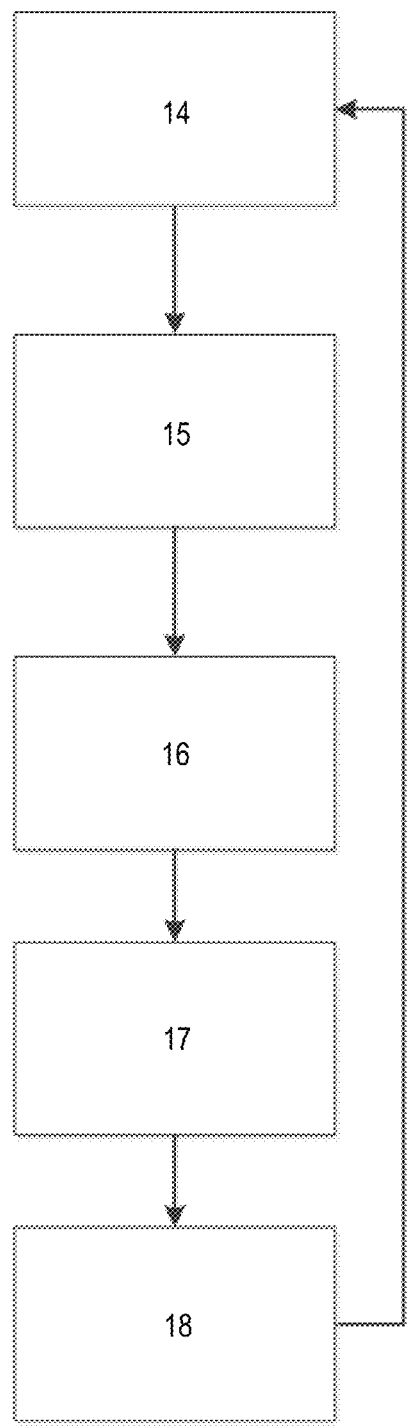

FIG. 5 schematically shows a preferred embodiment of the method according to the invention for cleaning spunbonding spinnerets during the production of cellulosic spunbonded nonwoven, comprising:

visual inspection of the surface of the spunbonding spinneret (14, corresponds to step (c))

detection of contaminations on the surface of the spunbonding spinneret (15, corresponds to step (d))

positioning of the spray device at a position suitable for spraying the contamination and spraying the contamination by means of an aqueous fluid precipitating the cellulose (16, steps (e) and (a))

coagulation of the cellulose on the surface of the spunbonding spinneret (17)

detachment and removal of the contamination by means of the gas stream (18, step (b))

while the production of spunbonded nonwoven is preferably not interrupted. Subsequent to step 18, the method can be repeated starting with step 14.

What is claimed is:

1. A method for producing a cellulosic spunbonded nonwoven, the method comprising:
   a) extruding a solution of cellulose in an aqueous organic solvent through nozzle holes of a spunbonding spinneret to form filaments;
   b) stretching the filaments in a direction of extrusion via a gas stream, wherein a contaminant including the cellulose accumulates on an exterior surface of the spunbonding spinneret;
   c) spraying, via an external spray device, an aqueous fluid onto the exterior surface of the spunbonding spinneret to precipitate the cellulose included in the contaminant; and
   d) removing the contaminant from the exterior surface of the spunbonding spinneret via the gas stream,
   wherein each of step a) and step b) is operated in a continuous manner, and
   wherein each of step c) and step d) does not interrupt continuous operation of each of step a) and step b).

2. The method of claim 1, further comprising the steps of:
   e) visually inspecting the surface of the spunbonding spinneret;
   f) detecting the contaminant on the exterior surface of the spunbonding spinneret; and
   g) positioning the external spray device at a position suitable for spraying the contaminant.

3. The method of claim 2, wherein at least one of steps e), f), and g) is carried out automatically.

4. The method of claim 1, wherein the aqueous fluid comprises at least one of liquid water, water vapor, or the aqueous organic solvent.

5. The method of claim 1, wherein the contaminant that has been removed is expelled from each of step a) and step b).

6. An apparatus for producing a cellulosic spunbonded nonwoven comprising:
   (a) a spunbonding spinneret comprising nozzle holes and an air outlet opening, capable of extruding a solution of cellulose in an aqueous organic solvent through the nozzle holes to form filaments;
   (b) a gas stream supplied from the air outlet opening, capable of stretching the filaments in a direction of extrusion from the spunbonding spinneret; and
   (c) an external spray device comprising at least one spray nozzle, capable of applying a fluid through the at least one spray nozzle onto an exterior surface of the spunbonding spinneret and precipitating cellulose included in a contaminant that accumulates on the exterior surface of the spunbonding spinneret,
   wherein the apparatus is capable of removing the contaminant from the exterior surface of the spunbonding spinneret via the gas stream.

7. The apparatus of claim 6, further comprising at least one positioning device for moving the external spray device to a desired location.

8. The apparatus of claim 6, further comprising a detection device for detecting the contaminant.

\* \* \* \* \*